US006324557B1

(12) United States Patent
Chan

(10) Patent No.: US 6,324,557 B1
(45) Date of Patent: Nov. 27, 2001

(54) COMBINATION EXERCISER GRIPPER AND CALCULATOR

(75) Inventor: Sik Leung Chan, Kowloon (HK)

(73) Assignee: CCL Products Enterprises, Baldwin, NY (US)

( * ) Notice: Subject to any disclaimer, the term of this patent is extended or adjusted under 35 U.S.C. 154(b) by 0 days.

(21) Appl. No.: 09/281,650

(22) Filed: Mar. 30, 1999

(51) Int. Cl.$^7$ ................. G06F 3/00; H05K 5/00
(52) U.S. Cl. ............................. 708/142; 361/80
(58) Field of Search ................... 708/100, 130, 708/131, 141, 142, 146; 361/680, 681, 683; 341/20, 22, 34

(56) References Cited

U.S. PATENT DOCUMENTS

| | | | | |
|---|---|---|---|---|
| D. 426,849 | * | 6/2000 | Lee | D18/7 |
| 5,432,510 | * | 7/1995 | Matthews | 341/20 |
| 5,604,493 | * | 2/1997 | Behlke | 341/22 |
| 6,164,853 | * | 12/2000 | Foote | 400/489 |
| 6,178,085 | * | 1/2001 | Leung | 361/683 |

* cited by examiner

Primary Examiner—Chuong Dinh Ngo
(74) Attorney, Agent, or Firm—Allen R. Morganstern

(57) ABSTRACT

A combination exercise gripper and calculator includes an electronic calculator, with a keypad, a power source, a visual display means, such as a liquid crystal display, and a calculating computing means, which is responsive to manual input from sequential depression of selected keys of the keypad for determining mathematical calculations. A switch is used to calculate these mathematical inputs. The manual griping means, including a pair of depressible handles, which are forcibly separated by a compressible spring wherein compression of the handles towards each other compresses this spring to provide a resistance against the compression. The switch includes a physical condition sensor, communicating with the calculating means. The switch is responsive to the calculating means upon compression of the handles. A counter is used to count the number of compressions the user has made by squeezing the handles. When pressing an on/off switch, the keypad designated as #1 and the keypad designated as the "plus sign," and "equal sign", when pressed in sequence, causes the correct number of compressions of the handles to be displayed upon the display of the calculator.

20 Claims, 6 Drawing Sheets

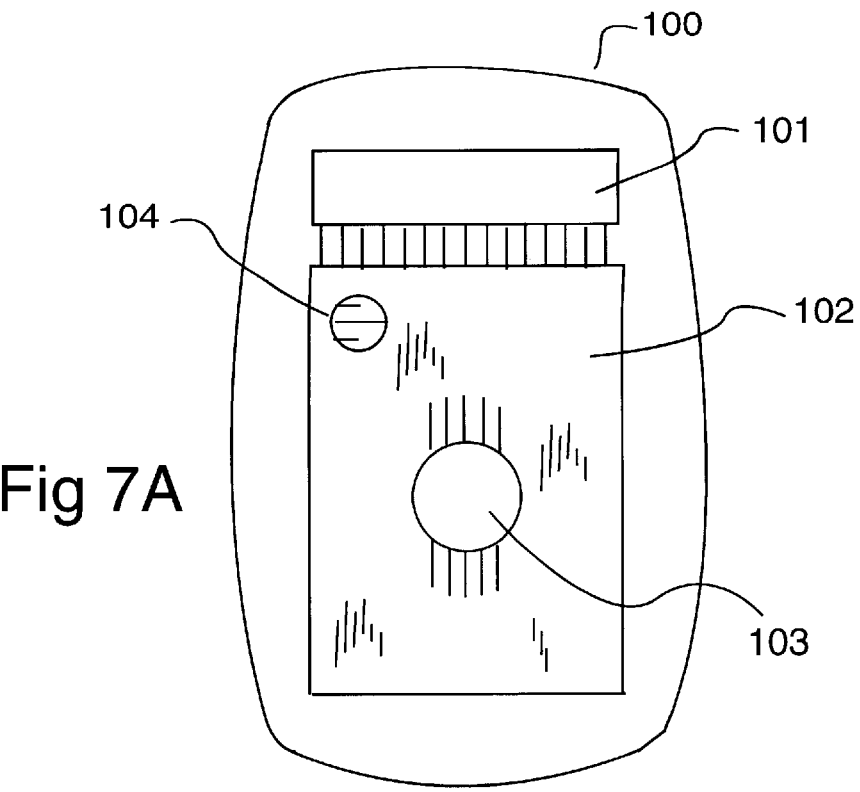
Fig 7A
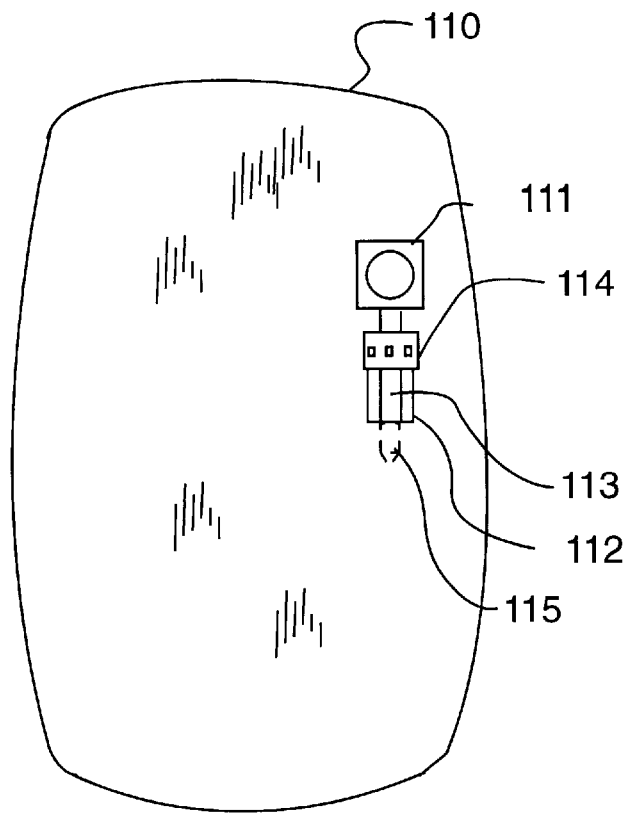
Fig. 7B
Fig. 7

COMBINATION EXERCISER GRIPPER AND CALCULATOR

FIELD OF THE INVENTION

The present invention relates to a combination of a gripper and a calculator.

BACKGROUND OF THE INVENTION

Exercise grippers including two handles which are compressed by manual force of the user's hand are well known. Furthermore, electronic calculators also well known.

However, neither has been combined into a single unit for both exercise and mathematical calculations.

OBJECTS OF THE INVENTION

It is an object of the present invention to provide a means to release the mental stresses of the users in their working place.

It is also an object of the present invention to provide a means to exercise the arm and upper body muscles while the users are thinking or idling in their working place.

It is yet also an object of the present invention to provide a counter to count the number of compressions the user has done on the unit.

It is yet also an object of the present invention to provide a combination exercise gripper and calculator which, when placed on a desk, looks and works as a calculator.

SUMMARY OF THE INVENTION

The combination exercise gripper and calculator includes an electronic calculator, with a keypad, a power source, a liquid crystal display and a calculating computing means, which is responsive to manual input from sequential depression of selected keys of the keypad for determining mathematical calculations.

A switch is used to calculate these mathematical inputs.

The manual griping means, includes a pair of depressible handles, which are forcibly separated by at least one compressible spring wherein compression of the handles towards each other compresses this spring or springs to provide a resistance against the compression. The switch includes a physical condition sensor, communicating with the calculating means.

The switch is responsive to the calculating means upon compression of the handles. To facilitate numerical tabulations, a counter is used to count the number of compressions the user has made by squeezing the handles. When pressing an on/off switch, the keypad designated as #1 and a keypad designated as "plus sign," when pressed in sequence, causes the correct number of compressions of the handles to be displayed upon the display of the calculator.

The exercise gripper further includes a flexible but resistant connection sheet, connecting the calculator to the left and right gripping handles. The connection sheet is flexible to accommodate movement of the handles toward each other and compression of the spring, whereby flexing of the connection sheet activates a switch within the calculator to activate the tabulation means therein.

Each handle includes a soft elastomeric sleeve to provide a comfortable manual gripping surface.

The spring may alternately include a plurality of springs, providing uniform resistance to the handles. The plurality of springs may include an upper guide and a lower guide between which guides the springs are located. These guides move the springs equally during the compression process.

For example, while three springs are used for a person of average strength and muscular build, for smaller persons the compression force can be reduced by reducing the number of springs to one or two springs.

Furthermore, upon squeezing of the handles toward each other, the spring or springs are compressed, resulting in the calculator portion of the combination exercise gripper and calculator being spatially displaced to a separate and distinct plane parallel to that of the handles and the spring or springs.

In addition, a bracket provides both a mechanical connection and a cushion between the plastic connection sheet and the gripping handles.

It is further noted that compression of the handles causes the visual display means, such as a liquid crystal display (LCD), to display each subsequent mathematical calculation calculated by impression of sequential depressions of the keypads.

The calculator includes a calculator housing containing a liquid crystal display (LCD) and a printed circuit board. The integrated circuit is attached to a board which also has the conductive keypad patterns for the plurality of user depressible keys on the keyboard on an opposite side. A single keypad pattern forms the part of the special switch or key which pattern is etched on the surface of the board.

A conductive elastomeric keypad is positioned in registration with the keypad when the cover is attached to the housing. A switch handle extends through the cover and pivots. It is biased by a leaf spring to maximize the excursion of the handle away from the surface of the calculator cover. The opposite end of the handle inside of the cover is therefore biased, to force the center of the keypad outward in such a way as to bridge the keypad pattern, thereby "closing" the switch. In the normal mounting of the calculator to the flexible connection sheet, this switch is in the "off" position, since the external end of the handle is against a part of the flexible sheet. In use, the switch makes momentary contact with each stroke of the exerciser gripping handles.

Electronically, the integrated circuit contains a calculator processor, an accumulator register, a display register, an operation register and an operand register. The keyboard has an "=/+" key switch.

In another embodiment, optionally the special key switch may be wired in parallel with the "=/+" key so that actuation of either is an equivalent operation.

In a further embodiment, optionally the keyboard may have separate "+" and "=" keys.

DETAILED DESCRIPTION OF THE DRAWINGS

FIG. 7A is an inside view of the calculator portion of the combination exercise gripper and calculator as depicted in FIG. 1, with the calculator means shown on a printed circuit board;

FIG. 7B is an inside view of the cover of the combination exercise gripper and calculator as depicted in FIG. 1, showing an extra keypad for activating the calculator by manual gripping of the gripper handles;

Figure 1:
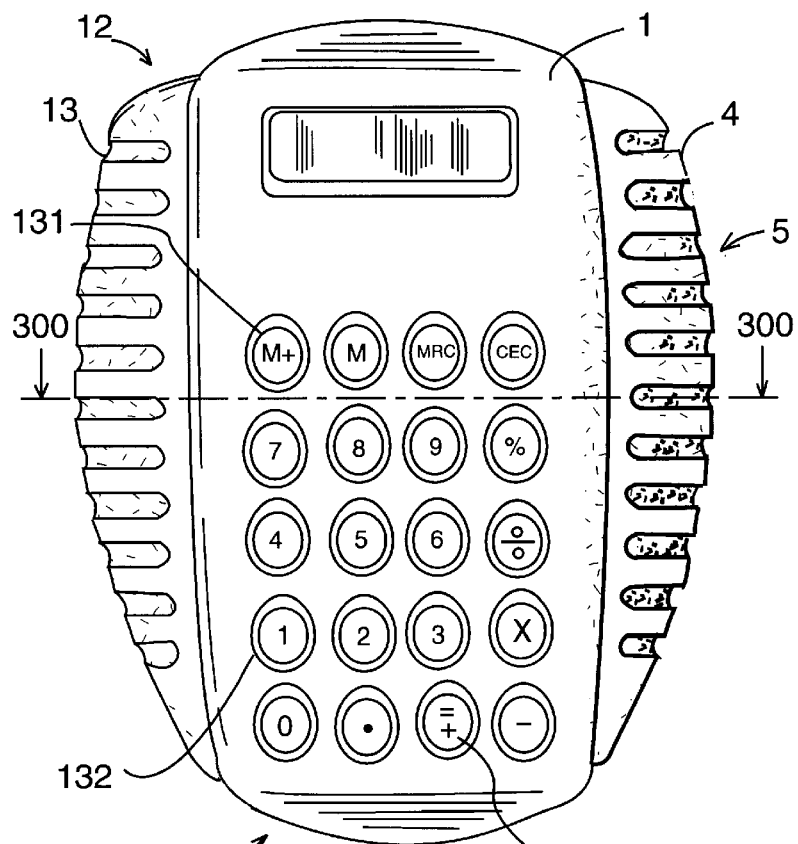
FIG. 1 is a top elevational view of an embodiment for a combination exercise gripper and calculator in a relaxed state.
Figure 8:
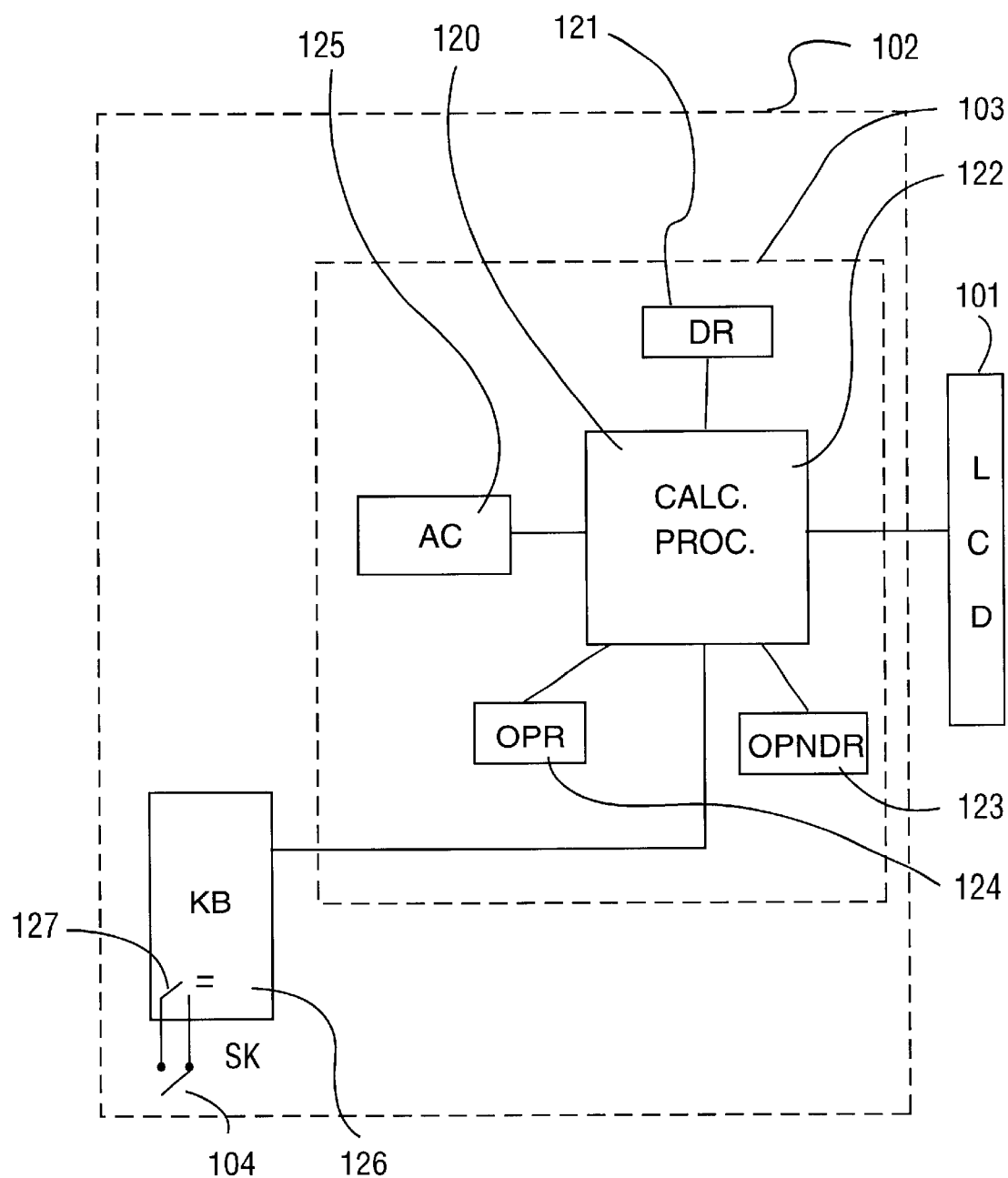
Figure 9:
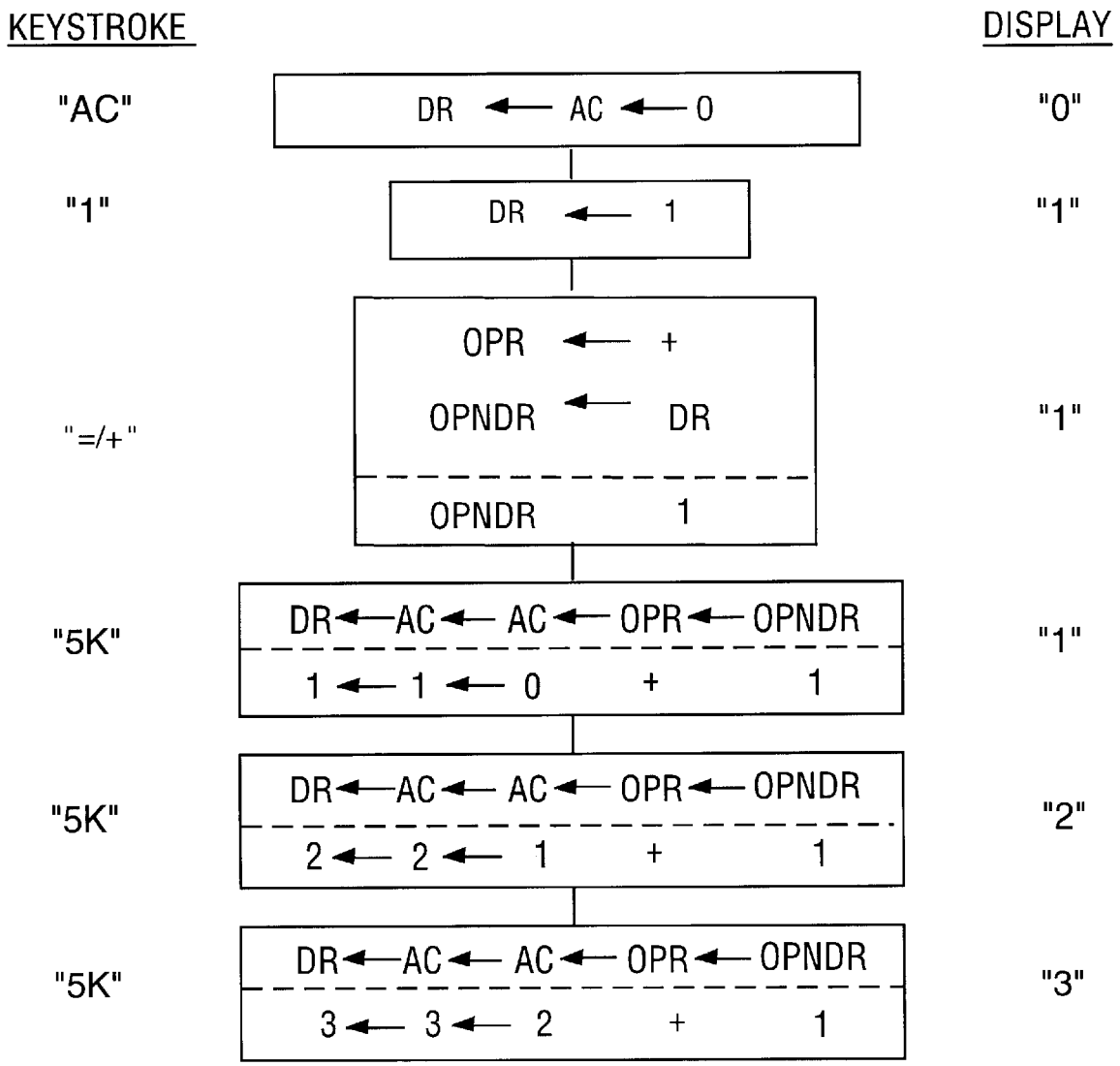

FIG. 8 is a block diagram of the calculator portion of the combination exercise gripper and calculator as depicted in FIG. 1, showing an extra key switch in registration with the extra keypad for activating the calculator by manual gripping of the gripper handles, as in FIG. 7B; and, FIG. 9 is a flow chart of the counting sequence of the combination exerciser gripper and calculator as depicted in FIG. 1.

DETAILED DESCRIPTION OF THE PREFERRED EMBODIMENTS

FIGS. 1–6 show the external features of one embodiment for a combination exercise gripper and calculator 200 including exercise gripper 201 and electronic calculator 1. Gripper 201 includes at least one force responsive handle, such as two elastomeric handles 5, 12 attached on the left and right sides of calculator 1 and covered by respective elastomeric covers 4, 13.

While drawing FIGS. 1–6 show a pair of handles 5, 12, it is known that other manual gripping configurations may apply, such as a member with a single handle (not shown) operating against a fixed fulcrum, or even other configurations with multiple handles in various geometric configurations, such as a manually grippable annular ring made up of compressible or movable members (not shown), or a tripod of three handles (not shown). Alternatively, the gripping means may be a plurality of parallel or non parallel members (not shown).

Figure 2:
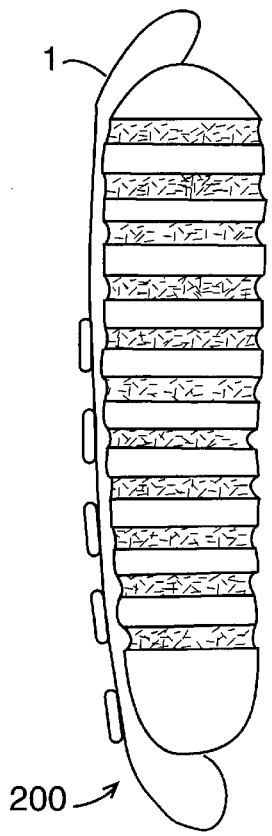
FIG. 2 is a side elevational view of the combination exercise gripper and calculator as in depicted in FIG. 1.
Figure 3:
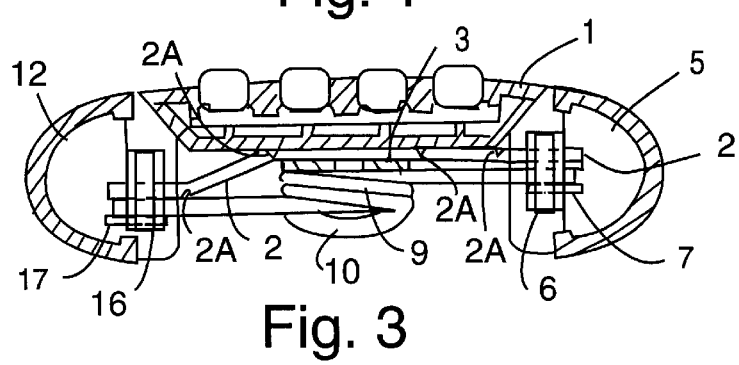
FIG. 3 is a cross sectional view of the combination exercise gripper and calculator as in FIG. 1; taken along line 300—300 of FIG. 1.

In FIGS. 1–3, the combination exercise gripper 201 and calculator 200 is shown in a relaxed state, with the gripping handles 5, 12 relaxed.

Figure 4:
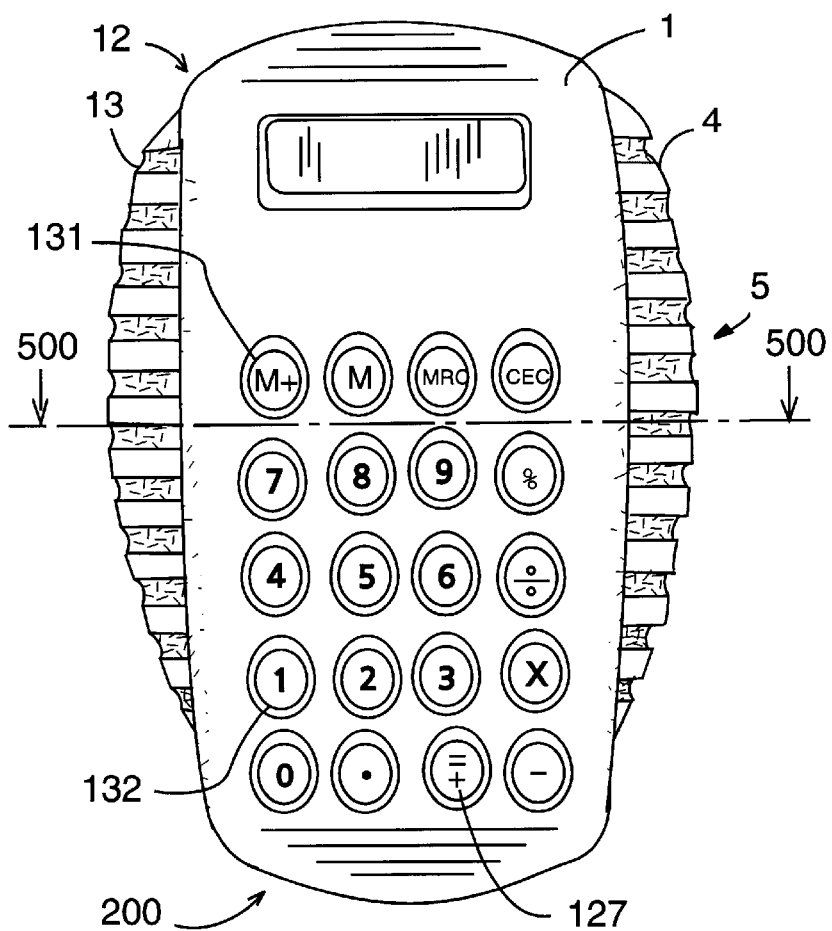
FIG. 4 is a top elevational view of the combination exercise gripper and calculator as depicted in FIG. 1 with the device shown in a compressed state.
Figure 5:
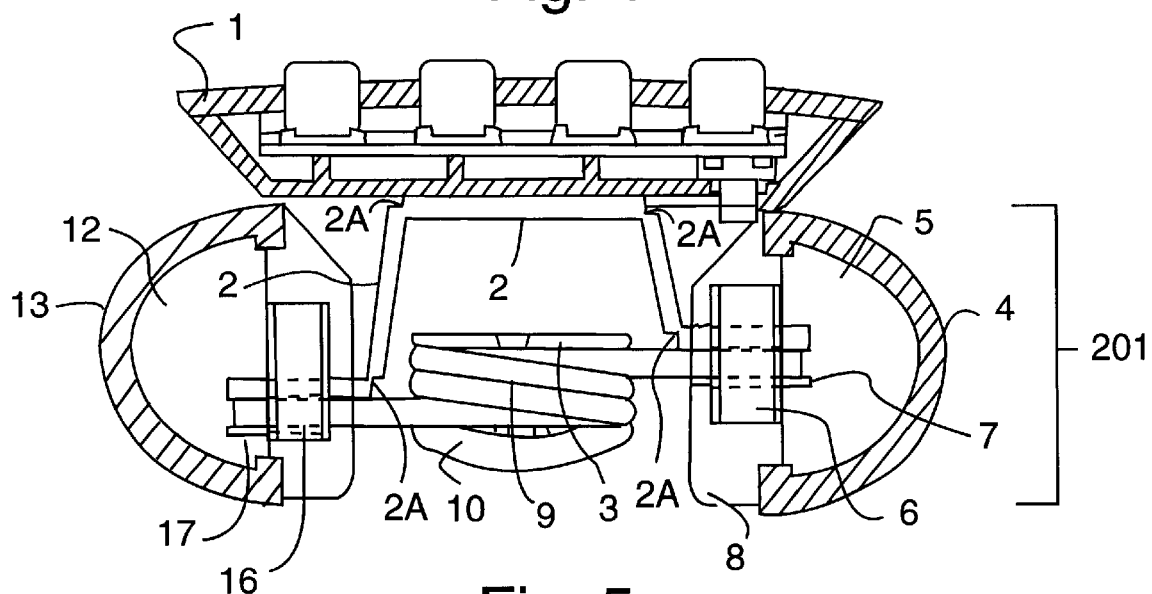
FIG. 5 is a cross sectional view of the combination exercise gripper and calculator as depicted in FIG. 1, taken along line 500—500 of FIG. 4.

In contrast, FIGS. 4–5 show the combination exercise gripper 201 and calculator 200 when respective handles 5, 12 are compressed towards and behind calculator 1. In use, calculator 1 raises to give way for respective handles 5, 12 to move inside and behind calculator 1.

For example, while FIG. 3 shows calculator 1 in a first predetermined planar position, FIG. 5 shows calculator being spacially displaced to a separate and distinct plane parallel to the plane of handles 5, 12 and one or more springs 9.

As shown in FIG. 7A, switch 104 is located within calculator 1, such as at an interior bottom or other location therein. Switch 104 is the equivalent of the (=/+) button of an ordinary calculator, such as (=/+) button 127 as shown in FIGS. 1 and 4. Each compression of handles 5, 12 actuates (=/+) button 127 once. In certain cases where a calculator has separate "+" and "=" keys, the equivalent key button to (=/+) button 127 would be an "=" button (not shown).

Combination exercise gripper and calculator 200 can be used to tabulate the number of compressions the user has accomplished while exercising. To start this tabulation, the user presses the accumulator actuation button 131, "1" button 132, and "=/+" button 127 on calculator 1 in sequence. Then the correct number of compressions done is shown on the liquid crystal display 101 of calculator 1.

Figure 6:
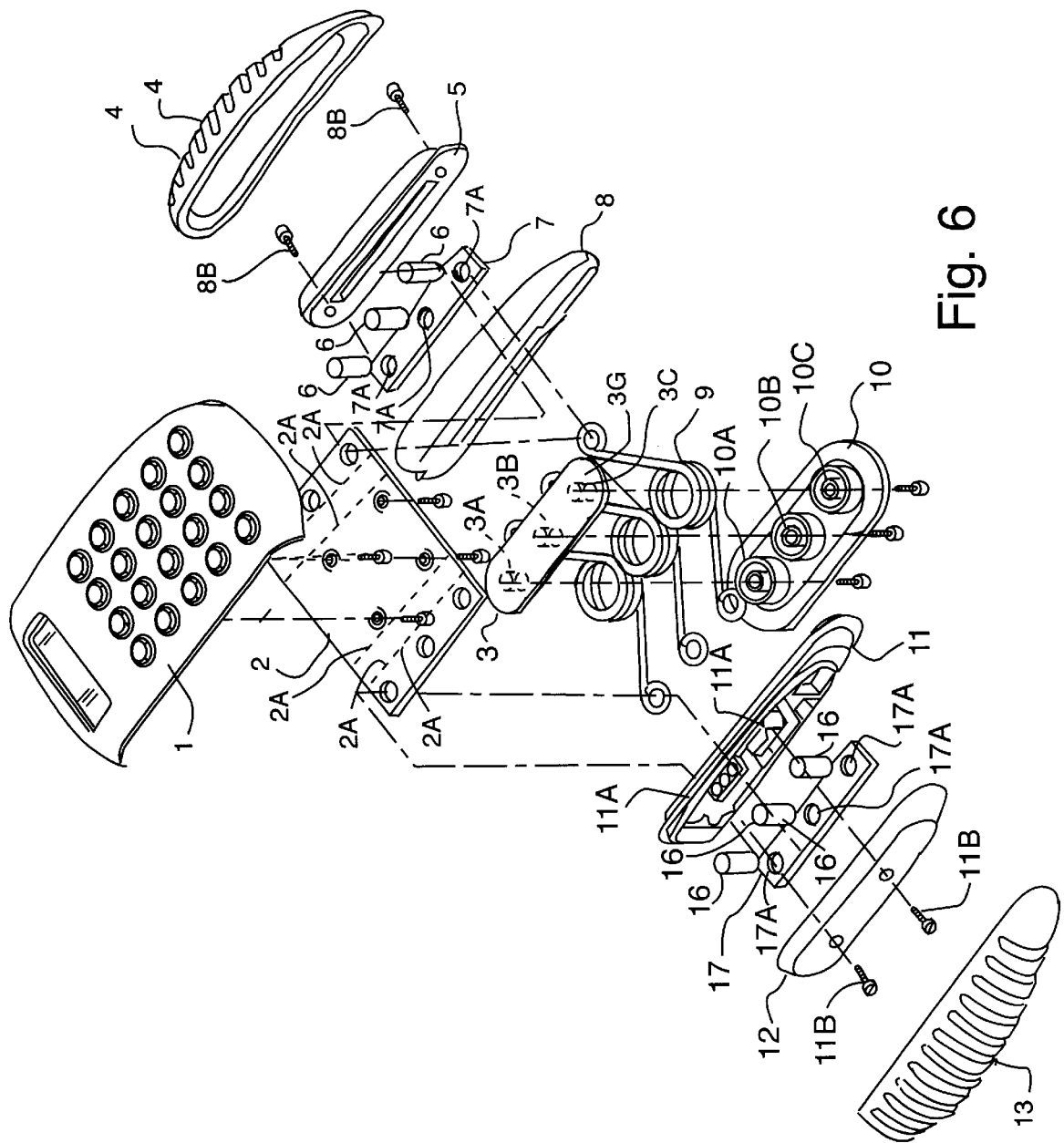
FIG. 6 is an exploded perspective view of the combination exerciser gripper and calculator as depicted in FIGS. 1–5.

FIG. 6 is an exploded perspective view showing how various parts of combination exercise gripper and calculator 200 fit together. Different functions of the parts of combination exercise gripper 201 and calculator 200 include calculator 1 connected to exercise gripper 201 by flexible but resistant connection sheet 2 made of a flexible but resistant material, such as a very tough plastic, for example, polypropylene. Connection sheet 2 connects calculator 1 to left and right handle structures 4,5 and 12, 13, and at the same time provides the flexibility to give the necessary movements of the handles 5, 12 with respective elastomeric sleeves 4 and 13, which are soft rubber sleeves provided on left and right handles 5, 12 to provide a comfortable touch for the hands of the user.

At least one spring 9, or a plurality of springs, such as, for example, two springs or three springs, gives the necessary resistance to the user compression of handles 5, 12. Although any number of springs 9 may be used, preferably two or three springs 9 are used, to give a more uniform resistance along handles 5, 12 and at the same time to make combination exercise gripper and calculator 1 more beneficial as an exercise device.

While FIGS. 1–6 show three springs 9 of one embodiment for a person of predetermined average strength and muscular build, for smaller persons or children, the compression force of springs 9 can be reduced by reducing the number of springs 9 to one or two springs. For example, the middle spring 9 of the three springs 9 of FIG. 6 can be removed, leaving two remaining springs 9, or the middle spring 9 of the three springs 9 of FIG. 6 can remain, and the other two showing springs 9 can be removed.

Furthermore, upon squeezing of elastomeric covers 4, 13 of handles 5, 12, one or more springs 9 are compressed, resulting in calculator 1 being spatially displaced to a separate and distinct plane parallel to that of handles 5, 12 and springs 9.

Springs 9 move within guides 3, 10, which guides 3, 10 are made of a strong lightweight material, such as plastic. FIG. 6 also shows projections 3A, 3B, 3C of guide 3, which mate with corresponding grooved mating structures 10A, 10B, 10C of guide 10. Either guide 3, or guide 10, may have such projections 3A, 3B, 3C and 10A, 10B, 10C, to align springs 9, and makes sure springs 9 move in unison in accordance with the movement of handle structures 4, 5 and 12, 13.

Handles 5, 12 have respective bases 8, 11 having fastener receptacles, such as fastener receptacles 11A of handle base 11, for insertion of fasteners 11B, such as screws, therein. Base 8 is of similar structure to that of base 11 with comparable fastener receptacles not showing and comparable fasteners as addressable thereto and as illustrated in FIG. 6 as "8B".

Between base 8 and handle 5 is provided horizontally oriented bracket 7, fabricated from or any other material that evidences strong rigidity and/or structural integrity, bracket 7 having at least one hole 7 formed therethrough for insertion of at least one pin 6 therein. Preferably a plurality of pins 6 are inserted within respective holes 7A in bracket 7. Pins 6 connect handle 5 to springs 9 at one end and to flexible but resistant sheet 2 at another end.

While FIGS. 1–3 show connection sheet 2 in a partially flattened configuration, when handle 5 is compressed against spring 9, as shown in FIGS. 4–5, flexible but resistant partially flattened connection sheet 2 flexes along four longitudinally extending hinges 2A thereof, as shown in the drawing FIG. 5, and assumes a winged U-shaped configuration with distal wing portions extending angularly from the inner U-shaped portion.

Flexing of connection sheet 2 causes switch 104, shown in FIG. 7A, to be activated within calculator 1 of combination exercise gripper 201 and calculator 200.

Likewise with respect to handle 12, between base 11 and handle 12 is also provided horizontally oriented bracket 17, fabricated from or any other material that evidences strong rigidity and/or structural integrity, steel bracket 17 having at least one hole 17A for insertion of at least one pin 16 therein. Preferably a plurality of pins 16 are inserted within respective holes 17a in bracket 17. Pins 16 connect handle 12 to springs 9 at one end and to flexible but resistant sheet 2 at another end. As with handle 5, when handle 12 is compressed against spring 9, flexible but resistant connection sheet 2 flexes along longitudinally extending hinges 2A thereof. As noted before, flexing of connection sheet 2 causes switch 104 to be activated within calculator 1 of combination exercise gripper 201 and calculator 200.

Brackets 7 and 17 cushion connection sheet 2 from the pressure on both ends of springs 9 exerted by compression of handles 5, 12 toward each other.

In order to understand the electronic functioning of calculator 1, it is necessary to view the inside of calculator 1. Therefore, FIGS. 7A and 7B show the insides of calculator 1.

In FIG. 7A, calculator housing 100 contains liquid crystal display (LCD) 101 and printed circuit board 102. Integrated circuit 103 is attached to board 102, which board 102 also has the conductive keypad patterns for the keyboard on the opposite side (not shown).

Single keypad pattern switch 104 forming the part of the special switch or key (SK) of the present invention is etched on this surface of board 102.

In FIG. 7B, conductive elastomeric keypad 111 is shown in registration with keypad switch 104, when cover 110 is attached to housing 100 of calculator 1. Switch handle 115 extends through cover 110 of housing 100. Switch handle 115 also pivots at pivot 114 and is biased by leaf spring 113 to maximize each excursion of handle 115 away from the surface of cover 110. The opposite end of handle 115 inside cover 110 is therefore biased to force the center of keypad 111 outward in such a way as to bridge keypad pattern switch 104, thereby "closing" the switch SK. In the normal mounting of calculator 1 to connection sheet 2, switch 104 is in the "off" position, since the external end of handle 115 is against a part of flexible connection sheet 2.

Switch 104 makes momentary contact with each stroke of exerciser gripper 201.

FIG. 8 is a block diagram showing liquid crystal display (LCD) 101 and the various components on printed circuit board 102. Integrated circuit 103 contains calculator processor 122, accumulator register (AC) 125, display register (DR) 121, operation register (OPR) 124, and operand register (OPNDR) 123. Keyboard 126 has "=/+" key switch 127.

In an alternate embodiment key switch 104 may be wired in parallel with "=/+" key 127 so that actuation of either is an equivalent operation.

In yet another embodiment, instead of key switch 127 being a "=/+" key, there may be separate "=" and "+" keys, in which case the key equivalent to "=/+" key 127 would be an "=" (equal) key, not a "+" (plus) key (both not shown in the drawings).

FIG. 9 shows a flowchart of the counting operation of calculator 1, in conjunction with compressions of exercise gripper 201.

The keystrokes are shown to the left of FIG. 9, while the display contents are shown to the right of FIG. 9. Both the symbolic as well as the numeric operations are shown.

Therefore, exercise gripper 201 can be used in combination with calculator 1 as both an exercise device and an electronic calculator. While calculator 1 can be used conventionally by making tabulations using the keys of the keypad and tabulating with the "=/+" key, calculator 1 can also be used by tabulating the calculations by compressing handles 5, 12 toward each other. In addition, calculator 1 can also be used to count the sequential number of compressions of handles 5, 12, so that the user can keep track of the user's exercise movements.

It is further known that other modifications may be made to the present invention, without departing from the scope of the invention, as noted in the appended Claims.

For example, the combination exercise gripper and calculator of the present invention can be modified for use with other calculators which have separate "+" and "=" key pad buttons, instead of a combined "=/+", such as button 127 of the present invention.

I claim:

1. A combination exercise gripper and calculator comprising:

manual gripping means communicating with an electronic calculator, said calculator including a keypad having a plurality of manually depressible keys, a power source, a visual display means, a calculating computing means responsive to manual input from sequential depression of selected keys of said keypad for determining mathematical calculations and a switch responsive to compressions of said manual gripping means for:

tabulating calculations of said calculating computing means and for:

displaying a display of said calculations on said visual display means.

2. The combination exercise gripper and calculator as in claim 1 wherein said manual gripping means includes a pair of compressible handles, said pair of compressible handles being forcibly separated by at least one compressible spring, wherein compression of said handles towards each other compresses said at least one spring to provide a resistance against said compression.

3. The combination exercise gripper and calculator as in claim 2 wherein compression of said handles and said at least one spring causes said calculator to be spatially displaced to a separate and distinct plane parallel to a plane in which said handles and said at least one spring are located.

4. The combination exercise gripper and calculator as in claim 1 wherein said at least one spring comprises a plurality of springs.

5. The combination exercise gripper and calculator as in claim 4 wherein said plurality of springs comprises two springs.

6. The combination exercise gripper and calculator as in claim 4 wherein plurality of springs comprises three springs.

7. The combination exercise gripper and calculator as in claim 4, wherein said plurality of springs provide uniform resistance to said handles.

8. The combination exercise gripper and calculator, as in claim 7, wherein said plurality of springs engages an upper guide and a lower guide, between which said upper and lower guides said plurality of springs are located, said guides causing said springs to compress equally during compression of said handles.

9. The combination exercise gripper and calculator as in claim 8, further comprising a bracket providing a cushioned connection between said flexible resistant connection sheet and said respective handles.

10. The combination exercise gripper and calculator as in claim 8 wherein said at least one spring moves within said upper and said lower guides, wherein at least one pair of a projection and a corresponding mating structure is provided between said guides, wherein each said projection mates with each corresponding mating structures to said guides together and to provide positioning means to position each said spring in a predetermined path of compression during compression of said spring responsive to said movement of said handles.

11. The combination exercise gripper and calculator as in claim 10 wherein each said handle has a respective base, between each said base and each said handle is provided a bracket, through which each said bracket is provided at least one hole for insertion of at least one joining means connecting each said handle to said at least one springs at one end thereof and to said connection sheet at another end, wherein when said handles are compressed against said at least one spring, said connection sheet flexes along at least one longitudinally extending hinge thereof.

12. The combination exercise gripper and calculator as in claim 11 wherein flexing of said connection sheet causes said switch to be activated within said calculator portion of said combination exercise gripper and calculator.

13. The combination exercise gripper and calculator as in claim 1 wherein said switch is a physical condition sensor, communicating with said calculating means, said switch being responsive to compression of said handles.

14. The combination exercise gripper and calculator as in claim 1, wherein said tabulating means counts a correct number of compressions the user has made by squeezing said handles.

15. The combination exercise gripper and calculator as in claim 14 wherein sequential pressure of an "on/off" switch, a keypad designated as "#1" and a keypad designated as "=/+" causes said correct number of compressions of said handles to be displayed upon said visual display means of said calculator.

16. The exercise gripper as in claim 1, wherein said exercise gripper further includes a flexible resistant connection sheet, connecting said switch of said calculator to said handles; said connection sheet being flexible to accommodate movement of said handles toward each other and to accommodate compression of said at least one spring.

17. The combination exercise gripper and calculator as in claim 1, wherein each said handle includes a soft elastomeric sleeve to provide a comfortable manual gripping surface.

18. The combination exercise gripper and calculator as in claim 1 wherein said calculator means comprises an integrated circuit board having conductive keypad patterns communicating with said plurality of keys of said keypad.

19. The combination exercise gripper and calculator as in claim 18 wherein said integrated circuit board contains a calculator processor, an accumulator register, a display register, an operation register and an operand register.

20. The combination exercise gripper and calculator as in claim 1 wherein said switch includes a handle having a digital end extending through said cover, said handle being pivotable and biased by a spring to maximize excursion of said handle away from said cover, wherein further an end of said handle is biased to bridge said keyboard pattern, thereby closing said switch, wherein said switch closes upon each stroke of said handles toward each other.

* * * * *